United States Patent
Clinchant et al.

(10) Patent No.: US 10,055,479 B2
(45) Date of Patent: Aug. 21, 2018

(54) JOINT APPROACH TO FEATURE AND DOCUMENT LABELING

(71) Applicant: Xerox Corporation, Norwalk, CT (US)

(72) Inventors: Stephane Clinchant, Grenoble (FR); Guillaume Bouchard, Saint-Martin-le Vinoux (FR)

(73) Assignee: Xerox Corporation, Norwalk, CT (US)

( * ) Notice: Subject to any disclaimer, the term of this patent is extended or adjusted under 35 U.S.C. 154(b) by 779 days.

(21) Appl. No.: 14/594,622

(22) Filed: Jan. 12, 2015

(65) Prior Publication Data
US 2016/0203209 A1 Jul. 14, 2016

(51) Int. Cl.
*G06F 7/00* (2006.01)
*G06F 17/30* (2006.01)
*G06N 99/00* (2010.01)

(52) U.S. Cl.
CPC ..... *G06F 17/30598* (2013.01); *G06N 99/005* (2013.01)

(58) Field of Classification Search
CPC .......... G06F 17/30616; G06F 17/3071; G06F 17/30864; G06F 17/30011; G06F 17/30038; G06F 17/30598
USPC ....................................................... 707/738
See application file for complete search history.

(56) References Cited

U.S. PATENT DOCUMENTS

| | | | |
|---|---|---|---|
| 8,452,770 B2* | 5/2013 | Peng | G06F 17/16 706/52 |
| 8,498,949 B2 | 7/2013 | Huh et al. | |
| 8,515,879 B2 | 8/2013 | Huh et al. | |
| 2004/0059736 A1* | 3/2004 | Willse | G06F 17/27 |
| 2006/0218140 A1* | 9/2006 | Whitney | G06F 17/3069 |

(Continued)

FOREIGN PATENT DOCUMENTS

| | | |
|---|---|---|
| CN | 102306492 A | 1/2012 |
| CN | 1093248 A | 5/2013 |
| EP | 2 112 603 A2 | 10/2009 |

OTHER PUBLICATIONS

Choo, Jaegul et. al. "UTOPIAN: User-Driven Topic Modeling Based on Interactive Nonnegative Matrix Factorization". Oct. 16, 2013. IEEE. IEEE Transactions on Visualization and Computer Graphics vol. 19, Issue: 12, Dec. 2013) . pp. 1992-2001. (Year: 2013).*

(Continued)

*Primary Examiner* — Michael Pham
(74) *Attorney, Agent, or Firm* — Fay Sharpe LLP

(57) ABSTRACT

Documents of a set of documents are represented by bag-of-words (BOW) vectors. L labeled topics are provided, each labeled with a word list comprising words of a vocabulary that are representative of the labeled topic and possibly a list of relevant documents. Probabilistic classification of the documents generates for each labeled topic a document vector whose elements store scores of the documents for the labeled topic and a word vector whose elements store scores of the words of the vocabulary for the labeled topic. Non-negative matrix factorization (NMF) is performed to generate a document-topic model that clusters the documents into k topics where k>L. NMF factors representing L topics of the k topics are initialized to the document and word vectors for the L labeled topics. In some embodiments the NMF factors representing the L topics initialized to the document and word vectors are frozen, that is, are not updated by the NMF after the initialization.

20 Claims, 2 Drawing Sheets

(56) References Cited

U.S. PATENT DOCUMENTS

| | | | | |
|---|---|---|---|---|
| 2010/0092084 | A1* | 4/2010 | Perronnin | G06K 9/00442 382/170 |
| 2010/0161611 | A1* | 6/2010 | Guo | G06F 17/30014 707/738 |
| 2012/0095952 | A1* | 4/2012 | Archambeau | G06K 9/6249 706/52 |
| 2013/0151520 | A1* | 6/2013 | Ankan | G06F 17/30619 707/737 |
| 2013/0204885 | A1* | 8/2013 | Clinchant | G06K 9/4676 707/756 |

OTHER PUBLICATIONS

Baeza-Yates, et al., "Modern Information Retrieval," ACM Press, Addison-Wesley, pp. 256-340 (1999).
Basu, et al., "A Probabilistic Framework for Semi-Supervised Clustering," Proceeding of the Tenth ACM SIGKDD International Conference on Knowledge Discovery and Data Mining, pp. 59-68 (2004).
Berkhin, "Survey of Clustering Data Mining Techniques," Technical Report, Accrue Software, pp. 1-56 (2002). •.
Bilenko, "Integrating Constraints and Metric Learning in Semi-Supervised Clustering," Proc. Int'l Cong. Machine Learning, pp. 1-8 (2004).
Cho, et al., "Minimum Sum-Squared Residue Co-clustering of Gene Expression Data," Proc. of the $4^{th}$ SIAM Data Mining Conference, pp. 1-12 (2004).
Cohn, et al., "Semi-supervised Clustering with User Feedback," Technical Report, Cornell University, pp. 1-6 (2003).
Davidson, et al., "Clustering With Constraints: Feasibility Issues and the κ—Means Algorithm," Proceedings of SIAM Data Mining Conference, pp. 1-12 (2005).
Dhillon, et al., "Co-clustering documents and words using Bipartite Spectral Graph Partitioning," Proceedings of ACM SIGKDD, pp. 1-6 (2001).
Dhillon, et al., "Information-Theoretic Co-clustering," Proceedings of the $9^{th}$ ACM SIGKDD Int'l Conference, pp. 89-98 (2003).

Ding, et al., "—K Means Clustering via Principal Component Analysis," Int'l Conf. Machine Learning (ICML) pp. 1-8 (2004).
Ding, et al., "Orthogonal Nonnegative Matrix Tri-factorizations for Clustering," Proceedings of ACM SIGKDD, pp. 126-135 (2006).
Hofmann, "Probabilistic Latent Semantic Indexing," Proc. ACM Conference on Research and Development, pp. 50-57 (1999).
Zongbao, et al., "Reply Networks on Bulletin Board System," Phys. Rev. E., vol. 67, pp. 1-7 (2003).
Lee, et al., "Algorithms for Non-negative Matrix Factorization," Advances in Neural Information Processing Systems, vol. 13, pp. 1-7 (2001).
Li, et al., "A General Model for Clustering Binary Data," KDD, Research Track Paper, pp. 188-197 (2005).
Li, et al., "The Relationships Among Various Nonnegative Matrix Factorization Methods for Clustering," Proceedings of the 2006 IEEE Int'l Conference on Data Mining, pp. 362-371 (2006).
Li, et al., "Solving Consensus and Semi-supervised Clustering Problems Using Nonnegative Matrix Factorization," Proceedings of the 2007 IEEE Int'l Conference on Data Mining, pp. 577-582 (2007).
Long, et al., "Unsupervised Learning on K-partite Graphs," Proceedings of ACM SIGKDD, pp. 317-326 (2006).
Slonim, et al., "Document clustering using word clusters via the information bottleneck method," SIGIR, pp. 208-215 (2000).
Strehl, et al., "Cluster Ensembles—A Knowledge Reuse Framework for Combining Multiple Partitions," Journal of Machine Learning Research 3, pp. 583-617 (2002).
Wagstaff, et al., "Constrained K-means Clustering with Background Knowledge," Proceeding of the $18^{th}$ International Conference on Machine Learning, pp. 577-584 (2001).
Wang, et al., "Semi-Supervised Clustering via Matrix Factorization," Proceedings of 2008 SIAM Int'l Conference on Data Mining, pp. 1-12 (2008).
Xing, et al., "Distance Metric Learning, with Application to Clustering with Side-Information," NIPS, pp. 1-8 (2002).
Zha, et al., "Spectral Relaxation for K-means Clustering," NIPS, pp. 1057-1064 (2002).
Zha, et al., "Bipartite Graph Partitioning and Data Clustering," CIKM, pp. 1-8 (2002).

* cited by examiner

JOINT APPROACH TO FEATURE AND DOCUMENT LABELING

BACKGROUND

The following relates to the document indexing and archiving arts, document retrieval arts, data mining arts, and so forth.

As used herein, the term "data mining" encompasses processing of a set of documents to extract useful data. As such, data mining as used herein encompasses document categorization, grouping, or indexing (in order to allow rapid retrieval of documents pertaining to a particular topic or that are similar to a representative document), document archiving (e.g. using a document categorization system or index), document and/or information discovery (e.g., discovering patterns in the documents, discovering information contained in the documents, et cetera), and so forth. In many data mining tasks, a document category (or topic) system must be prepared based on limited knowledge of a small sub-set of the topics that need to be indexed. For example, consider the task of a company or other entity specializing in photovoltaic energy production, which wishes to investigate the literature (i.e. a set of documents) to assess the role of photovoltaic energy in the energy landscape. Such a company is quite capable of formulating definitions for topics closely related to photovoltaic energy, e.g. topics such as "solar cells", "solar collection efficiency", and so forth. Company personnel may also have varying levels of knowledge of related areas, such as concentrated solar power techniques, nuclear energy, fossil fuels, and so forth, but usually do not have sufficient knowledge to identify and define specific topics pertaining to these areas with sufficient accuracy and detail to enable mining the literature for these topics.

More generally, it is often the case that a data mining task will be motivated by the desire to locate documents pertaining to one, two, or a few, "hot" topic(s) of interest, which can be precisely defined—but additional relevant topics are known or suspected to exist, which also need to be mined, but for which insufficient information is available to construct accurate topic definitions.

Existing data mining techniques have some deficiencies in addressing such a task. In classification techniques (also known as supervised learning), a set of documents are provided that are labeled by topic, and this set of labeled documents is used to train a classifier. This approach can create a very accurate classifier for the pre-defined categories (i.e. topics)—but only if those categories are accurately known and defined beforehand, e.g. by laborious manual labeling of a sufficiently large set of training documents. Pre-defining these categories (e.g. labeling the training documents) entails laborious user interfacing with the system. The extensive a priori knowledge required may be expensive to obtain in terms of cost, human resources, or both. Supervised learning of a classifier using a set of pre-labeled training documents is also unable to discover new topics not known beforehand.

Clustering techniques, on the other hand, group documents into clusters based on document similarity without relying on any pre-defined topics (e.g. topic-labeled training documents). Clustering is also known as unsupervised learning, and has the potential to group documents into semantically meaningful topics without a priori knowledge of those topics, thereby enabling topic discovery. In practice, however, the generated clusters may not have semantic significance, or may contain numerous outliers that are only tangentially related to the semantic identification assigned to the cluster. Successful use of clustering may involve numerous repetitions of the clustering algorithm, with each repetition employing different initial conditions, in order to arrive at a usable result, and/or the clustering results may need a substantial amount of manual adjustment in order to be rendered usable.

Another difficulty with clustering is that there is typically no mechanism to ensure accurate labeling of documents as to "hot" topic(s), as compared with other topics that may be of less importance or interest. Said another way, there is no reason to expect the clustering to generate clusters representing hot topics that are more accurate than clusters representing other topics—indeed, there is no guarantee that any of the generated clusters will correspond to a given hot topic at all, in which case the clustering must be re-run with different initial conditions in the hope of converging to a semantically meaningful result. There are numerous reasons why it may be desirable to have enhanced accuracy for the certain "hot" topic(s). In the illustrative case of the entity specializing in photovoltaic energy production performing an energy landscape study, if the results are presented to a potential client and have inaccuracies in topics relating to photovoltaic energy, this would be particularly embarrassing given the entity's purported expertise in photovoltaics.

Disclosed in the following are improved data mining techniques that provide various benefits as disclosed herein.

BRIEF DESCRIPTION

In some embodiments disclosed herein, a document labeling system comprises an electronic data processing device configured to label documents comprising text of a set of documents by operations including: (i) receiving L labeled topics each labeled with a word list comprising words representative of the labeled topic; (ii) performing probabilistic classification of the documents of the set of documents to generate for each labeled topic of the L labeled topics a document vector whose elements store scores of the documents for the labeled topic and a word vector whose elements store scores of words of a vocabulary for the labeled topic; and (iii) performing non-negative matrix factorization (NMF) to generate a NMF model that clusters the set of documents into k topics where k>L and the performing NMF includes initializing NMF factors representing L topics of the k topics to the document and word vectors for the L labeled topics generated in the operation (ii). In some embodiments, the operation (ii) comprises: (ii)(a) performing probabilistic classification of the documents of the set of documents based on text content of the documents and the word lists of the L labeled topics and generating a document vector for each labeled topic whose elements store scores of the documents for the labeled topic produced by the probabilistic classification; and (ii)(b) based on the document vectors for the L labeled topics and the text content of the documents of the set of documents, generating a word vector for each labeled topic whose elements store scores of words of a vocabulary for the labeled topic. In some embodiments the NMF factors representing the L topics initialized to the document and word vectors generated in operation (ii) are frozen, that is, not updated by the NMF after the initialization. The probabilistic classification of operation (ii) is in some embodiments performed using a Naïve Bayes or logistic regression classifier.

The document labeling system of the immediately preceding paragraph may further comprise a display device. In some embodiments, the electronic data processing device is configured to perform further operations including: (iv) assigning at least one label to a document of interest of the set of documents based on the generated NMF model; and (v) displaying the at least one label assigned to the document of interest on the display device. In some embodiments, the electronic data processing device is configured to perform further operations including displaying a list of documents of the set of documents indicated by the generated NMF model as belonging to a topic of interest of the k topics.

In some embodiments disclosed herein, a document labeling method comprises: receiving, at an electronic data processing device, D documents each represented by a bag-of-words (BOW) vector of length W over a vocabulary; receiving, at the electronic data processing device, L labeled topics wherein each labeled topic is labeled with a word list comprising words of the vocabulary that are representative of the labeled topic; performing, using the electronic data processing device, probabilistic classification of the D documents to generate for each labeled topic a document vector of length D and a word vector of length W; and performing, using the electronic data processing device, non-negative matrix factorization (NMF) to generate a NMF model that clusters the D documents into k topics where k>L and the performing NMF includes initializing NMF factors representing L topics of the k topics to the document and word vectors for the L labeled topics generated by the probabilistic classification off the D documents. The operation of performing probabilistic classification may comprise: performing probabilistic classification of each document with respect to each labeled topic by computing an overlap score quantifying overlap of the BOW vector representing the document with the word list of the labeled topic; generating a document vector of length D for each labeled topic whose elements store the overlap scores of the D documents with the word list of the labeled topic; and generating a word vector of length W for each labeled topic based on the document vector for the labeled topic and the BOW vectors representing the D documents. In some embodiments, the NMF factors representing the L topics initialized to the document vectors of length D and word vectors of length W generated by the probabilistic classification are not updated by the NMF after the initialization.

In some embodiments disclosed herein, a non-transitory storage medium stores instructions executable by an electronic data processing device to label documents of a set of D documents each represented by a bag-of-words (BOW) vector of length W over a vocabulary by operations including: (i) receiving L labeled topics each labeled with a word list comprising words of the vocabulary that are representative of the labeled topic; (ii) performing probabilistic classification of the D documents to generate for each labeled topic of the L labeled topics a document vector of length D whose elements store scores of the D documents for the labeled topic and a word vector of length W whose W elements store scores of the W words of the vocabulary for the labeled topic; and (iii) performing non-negative matrix factorization (NMF) to generate a NMF model that clusters the D documents into k topics where k>L and the performing NMF includes initializing NMF factors representing L topics of the k topics to the document and word vectors for the L labeled topics generated in the operation (ii). The operation (ii) may comprise: (ii) (a) performing probabilistic classification of the D documents based on the BOW vectors representing the D documents and the word lists of the L labeled topics and generating a document vector of length D for each labeled topic whose D elements store scores of the D documents for the labeled topic produced by the probabilistic classification; and (ii) (b) generating the word vectors of length W for the L labeled topics based on the document vectors for the L labeled topics and the BOW vectors representing the D documents. In some embodiments the NMF factors representing the L topics initialized to the document and word vectors generated in operation (ii) are not updated by the NMF after the initialization.

DETAILED DESCRIPTION

Figure 1:
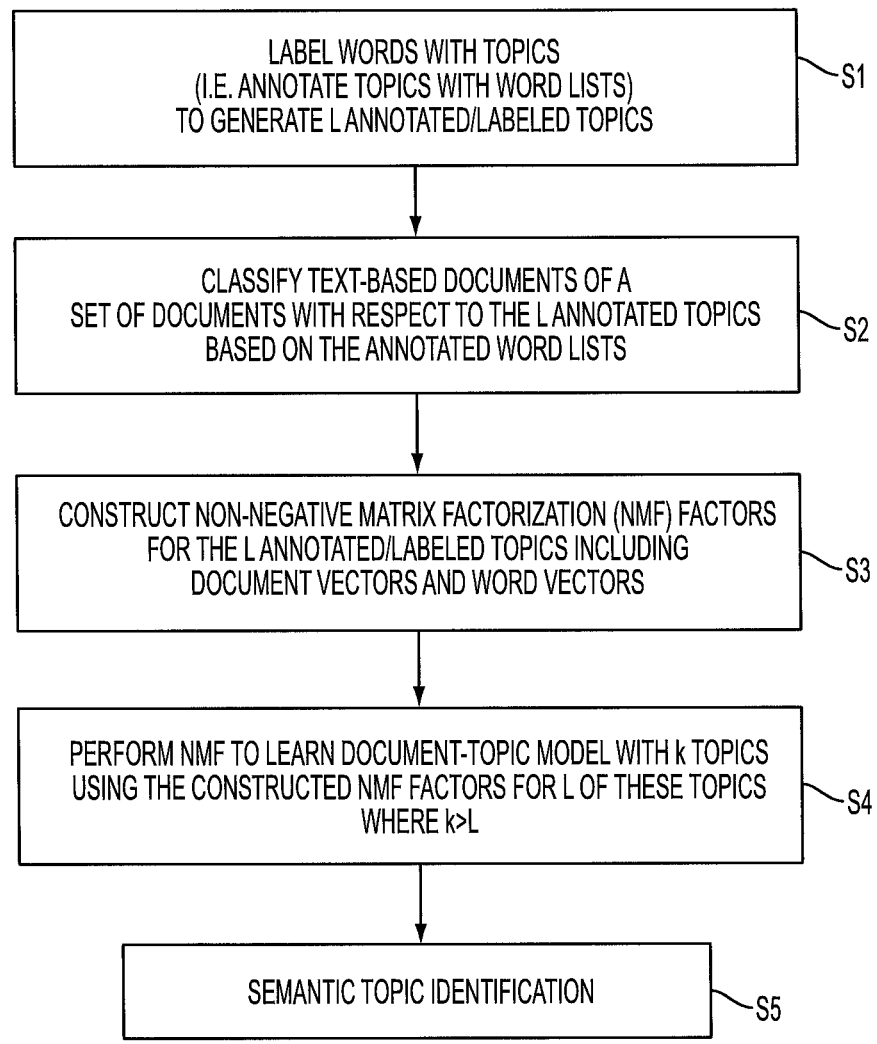
FIG. 1 diagrammatically illustrates a method of learning a document-topic model as disclosed herein.

With reference to FIG. 1, disclosed herein are data mining systems that leverage feature labeling and document labeling. The illustrative embodiments pertain to text-based documents, by which it is meant that each document of the set of documents contains sufficient textual content to be semantically characterized based on its text content. The text-based document may comprise entirely text, or may comprise text and other content (e.g., a multimedia document containing text, images, video clips, audio clips, and so forth). Each document is assumed to be in an electronic form with the text represented in a format enabling words to be identified, e.g. as ASCII strings or the like. The documents may be provided directly in electronic form (e.g. produced by a word processor, slideshow presentation program, or so forth) or may be paper documents that are optically scanned and processed by optical character recognition (OCR) to generate ASCII text representations of the words of the document.

With reference to FIG. 1, the disclosed data mining approaches generate a document-topic model of a set of documents as follows. In a first operation S, words (which are features of a text-based document represented by a bag-of-words vector) are labeled with topics; or, equivalently, each topic to be annotated is annotated by a word list. This first operation S1 may be done manually, but manual association (i.e. labeling) of words with topics is much faster than manual association of documents with topics. This is because the human annotator labeling a word need only consider that single word and place it into one (or, in some embodiments, more than one) topic. A word has only one, two, or at most a few possible meanings, making word labeling straightforward. In a variant approach, the human annotator may be given the topic and asked to perform "word association" to assign words to the topic—again, this is a fast process requiring little effort on the part of the human annotator. By contrast, to perform document labeling (such as is required to generate a labeled training set of documents for supervised classification), the human annotator must read the document in order to grasp its semantic meaning, and then assign the document to (at least one) topic. Comprehensive reading of the document is more difficult than comprehending a single word, and moreover the document may be susceptible to numerous meanings. A further complication in the case of multi-media documents is that the human annotator may take into account non-textual content of the document (e.g. images) in labeling the document, so that the label may not accurately reflect the textual content of the document.

The first operation S1 of the disclosed technique does not need to be comprehensive, either in terms of the words associated to each label or in terms of the topics which are labeled. Rather, each topic may be annotated with a word list consisting of only a small sub-set of the words of the vocabulary that can reasonably be associated with the topic. Similarly, only a few topics of the intended topic model need to be labeled with word lists. For example, in some actually performed examples disclosed herein, the topic model includes 15 topics, of which only 2-4 "hot" topics are labeled with word lists. Thus, the user interfacing with the document indexing, labeling, or mining system is greatly facilitated as compared with document classification systems which require exhaustive (and typically manual) pre-definition of every topic.

The second operation S2 employed in the disclosed object indexing, labeling, or mining system comprises classifying documents of a training set of documents with respect to only the annotated topics using the word lists that annotate those topics. This classification suitably scores each document respective to an annotated topic by computing an overlap score quantifying overlap of a bag-of-words (BOW) vector representing the document with the word list of the labeled topic. The classification may train a classifier such as a multinomial Naïve Bayes classifier or a logistic regression classifier. The classifier is preferably a probabilistic classifier that outputs scores for the documents respective to the annotated topics, i.e. a document containing many words of a word list annotating a first topic and few words of a word list annotating a second topic will be expected to have a higher score (high overlap score) for the first topic as compared with the second topic—but the score may be non-zero for both first and second topics (overlap score is not zero for the second topic).

The third operation S3 then uses the learned Naïve Bayes, logistic regression, or other learned classifier to extract vectors representing the topics so as to construct non-negative matrix factorization (NMF) factors representing the annotated topics, namely the document and word vectors for the annotated topics. In a suitable approach, elements of a document vector are initialized to the scores of the documents for the annotated (i.e. labeled) topic produced by the probabilistic classification. The word vector for the topic is then generated based on the document scores (suitably represented by the document vector) and based on the text content of the documents. The elements of the word vector for each annotated topic store scores of words of the vocabulary for the annotated topic. For a given word w, the score is suitably computed as a sum of the count of word w in each document (e.g., obtained from a BOW document representation) times the score of that document for the topic. Advantageously, this third operation S3 fills out the characterization of each annotated topic. That is, even though the annotated word list for the topic may have been a small sub-set of the vocabulary, with limited accuracy even for those words (indeed, in some embodiments the word list may be binary, i.e. the words may be associated to the topic without weighting values), the third operation S3 results in a complete word vector representing the topic, along with the document vector. The word vector generated by the third operation S3 provides scores respective to the topic for all words of the vocabulary, not merely those words on the word list.

A fourth operation S4 of the disclosed approach performs non-negative matrix factorization (NMF) using the initialized factors for the annotated topics. In some embodiments, those initialized factors are also frozen during the NMF, that is, the NMF factors representing the annotated topics and initialized based on the first-through-third operations S1-S3 are not updated by iterations of the NMF after the initialization. Denoting the number of annotated topics by L, the NMF is constructed to provide k topics with k>L (and in some embodiments with k significantly larger than L, e.g. k=15 and L=2 to L=4 in some embodiments). Thus, the NMF generates document and word vectors representing additional topics, but which are also consistent with the document and word vectors for the L annotated topics generated in the third operation S3.

In an optional operation S5, the topics of the document-topic model may be semantically identified. This is trivial for the L annotated topics, since these had a semantic identification in order to perform operation S1. The remaining (k−L) topics are suitably given semantic identifications based, for example, on a manual review of a "top-N" word list consisting of the N highest-ranked words in the word vector generated for the topic by the NMF (where N is an essentially arbitrary number chosen to create a list that is a small sub-set of the total vocabulary while also being long enough to provide the human reviewer with a meaningful amount of information for the semantic identification. Thus, operation S5 is again a rapid process that does not require significant mental exertion and is fast. In some embodiments, it is contemplated to perform the operation S5 in an automated, rather than manual, fashion—for example, the operation S5 can assign as the semantic identification of each topic the top-N words in the NMF-learned word vector for the topic (here N is likely to be chosen to be small, e.g. N=2-8 in some embodiments). In these semantic identification approaches employing a "top-N" list, the list can instead be defined in a different manner—for example the list of words used for the manual or automatic semantic identification can be limited to words whose word vector element value is above a cutoff threshold. This approach is based on the recognition that the word vector element value for a vocabulary word is a metric of the strength of association of the word to the document, that is, roughly corresponds to the probability of being associated with the topic.

It may also be noted that for certain applications, such as discovery-based data mining, performing the operation S5 (either manually or automatically) may directly provide a useful result, that is, the process S5 of identifying semantic meaning for a topic generated by the process operations S1-S4 may itself act as a data mining or discovery process by which the user discovers semantic information contained in the set of documents. By way of illustration, considering the previous example of a company specializing in photovoltaics performing an energy landscape investigation, the L annotated topics are likely to be related to photovoltaics as those are the topics for which company personnel can generate accurate word lists. In the operation S5, company personnel reviewing the (k−L) topics may discover some of those topics relate to other energy generation techniques not previously known (or not well-known) to the company personnel.

Considering the document-topic model creation method described with reference to FIG. 1, it is noted that the first operation S1 is the primary or only user interfacing operation entailed in creating the document-topic model. This operation S1 advantageously is less laborious than the extensive and exhaustive user interaction needed to define the categories of a classification system, for at least the following reasons: (1) the user is required to annotate only a sub-set (L) of the total set of topics (k) created by the method; (2) the user annotations for each of the L topics can be non-exhaustive, i.e. the user need only label the topic with a few words of the vocabulary; and (3) the manual annotation of operation S1 amounts to annotating words (or, equivalently, coming up with a non-exhaustive word list with which to label a document), which requires less mental exertion and is faster than annotating documents. The optional semantic identification operation S5, if performed, also does not require significant mental exertion and is fast (and as already described in some embodiments may be fully automated, and/or may be an integral part of the data mining process directly yielding useful information). Thus, the method of FIG. 1 provides a data mining system that requires less overall user interaction, and more efficient user interaction.

At the same time, the operation S1 advantageously provides sufficient a priori-known information, in a rapid fashion, to generate an accurate document-topic model for a larger number of topics (k) than the few topics (L) that are annotated (L<k, preferably L<<k). The created document-topic model is also expected to have enhanced accuracy for the L annotated topics since the a priori-known information is particularly directed to those L topics, which are typically chosen to be "hot" topics, that is, topics of substantial interest. By contrast, a clustering approach produces a document-topic model based on little or no a priori-known information, and thus successful use of clustering to create a document-topic model may involve numerous repetitions of the clustering process with different initial conditions in each repetition in order to arrive at a usable model, and/or the resulting model may need a substantial amount of manual adjustment in order to be rendered usable. Indeed, clustering is based on the "hope" that the clusters will align with some semantically meaningful topics; whereas, the method of FIG. 1 ensures that at least L topics will align with semantically meaningful topics (and, even more, with important topics), and the NMF learning of the remaining (k−L) topics is constrained to produce a document-topic model comporting with the L annotated topics, which is expected to bias the NMF toward producing semantically meaningful topics. As creation of the document-topic model is typically the most computationally intensive part of the data mining process, it is seen that the method of FIG. 1 also provides a data mining system with improved efficiency and speed.

In the operation S2, the document classifications are produced by the scoring respective to the word lists for the annotated topics. However, if additional document labeling is available, then it can also be utilized. For example, a (typically small) sub-set of the documents may be manually labeled with topic labels, and the manually applied document topic labels can be used in the subsequent operations S3, S4 both for initialization of the NMF factors and (preferably) freezing the manually applied labels during the subsequent NMF iterations. Viewed another way, a topic is annotated by a list of relevant words, but also may be annotated by a list of relevant documents, and both pieces of information may be used to advantage.

The illustrative clustering operations S3, S4 employ NMF clustering, which may in more specific embodiments employ specific types of NMF clustering such as Latent Dirichlet Allocation (LDA) or Probabilistic Latent Semantic Analysis (PLSA). More generally, the illustrative NMF clustering operations S3, S4 may be replaced by another type of clustering such as a K-means clustering algorithm. In general, the clustering operation clusters the D documents into k clusters where k>L, and the initialization (corresponding to operation S3) includes initializing L clusters of the k clusters to the L labeled topics as defined by the operation S2. In some generalized embodiments, the L clusters initialized to the L labeled topics are not updated by the clustering after the initialization; while in other embodiments these L clusters are updated by iterations of the clustering algorithm after the initialization.

Figure 2:
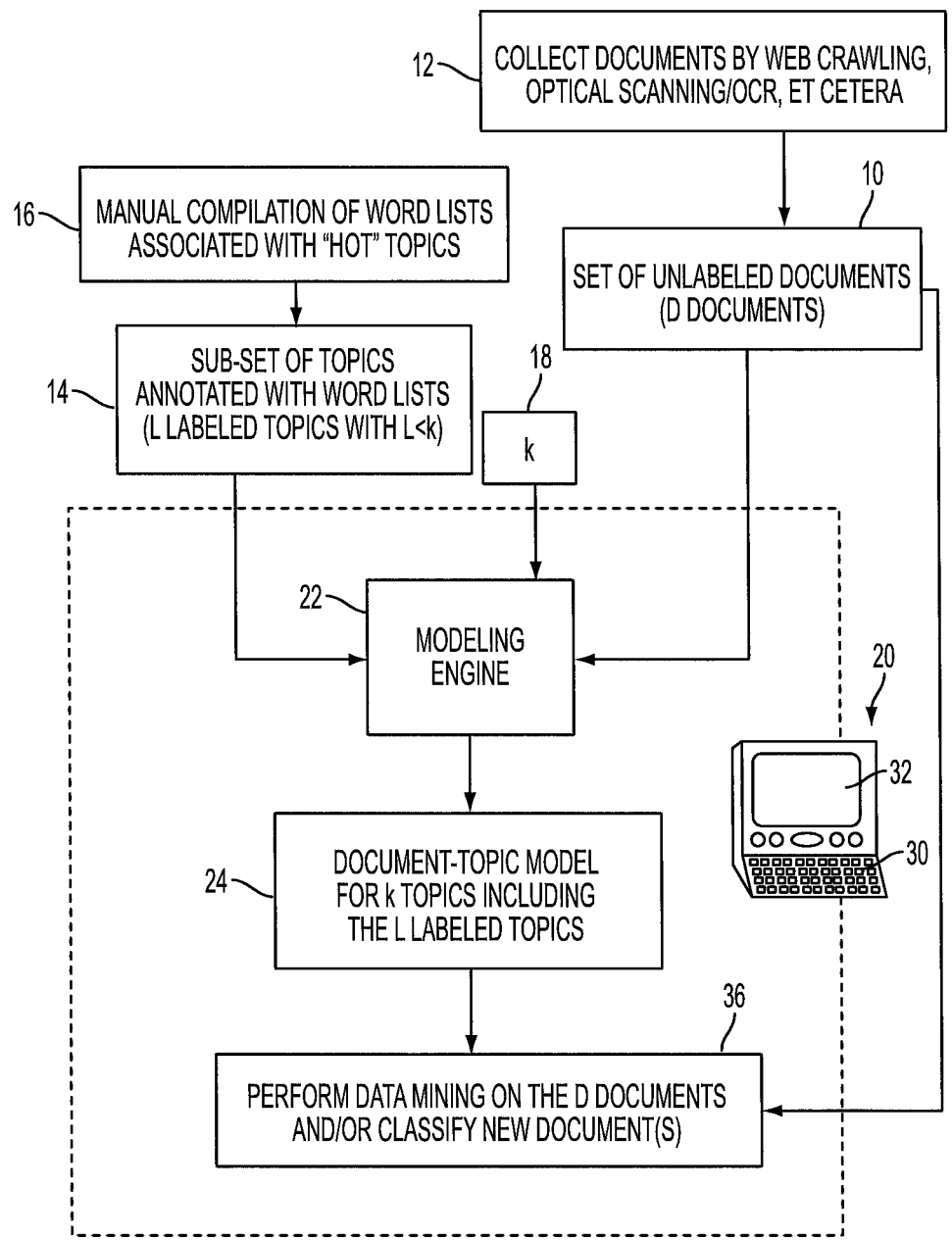
FIG. 2 diagrammatically illustrates a data mining system with improved accuracy and computational efficiency obtained using a NMF-based documents-topics model produced by a modeling engine implementing the method of FIG. 1.

With reference to FIG. 2, an illustrative data mining system operates on a set of unlabeled documents 10 (D documents, without loss of generality) which are acquired by an operation 12 such as web crawling, optical scanning/OCR of printed documents, or so forth. The D documents are provided in an electronic format with the textual content of each document represented as ASCII words or the like. A vocabulary (not shown in FIG. 2) is defined, which consists of (without loss of generality) a set of W words. Typically, the vocabulary excludes so-called "stop" words such as "a", "an", "the" and so forth which have little semantic meaning. Each document of the set of documents 10 is typically represented as a "bag-of-words" (BOW) vector of length W, with each element of the BOW vector representing a count of a vocabulary word corresponding to that element. The BOW elements are optionally stored in a term frequency-inverse document frequency (TF-IDF) format or other format that adjusts the word statistics to reflect the relative importance of words in the document that is represented by the BOW vector. The term "bag-of-words representation" or "BOW representation" or "BOW vector" as used herein encompasses all such variants in which a document is represented by a vector of values corresponding to vocabulary words in which each value is indicative of an occurrence statistic of the corresponding vocabulary word in the document.

An additional input to the data mining system is a (sub-)set of topics which are annotated (L annotated topics 14, without loss of generality) each of which topics is annotated by a word list generated by a manual operation 16 in which a human annotator labels words with topics; or, alternatively, the manual operation 16 may entail a human annotator labeling each topic of the L topics with a word list. (Said another way, the human annotator may be supplied with words and asked to assign topic label to the words; or, equivalently the human annotator may be supplied with topics and asked to assign words to the topics—the result in either case is each topic is annotated with a word list). It will be appreciated that the set of L annotated topics each annotated by a word list corresponds to the output of the operation S1 of FIG. 1. In the word list annotated to a given topic, each word optionally may include a weight indicating its strength of association to the topic relative to other words of the list.

A further input to the data mining system is the number of topics 18, designated without loss of generality as k, to be included in the created document-topic model. In general, k>L, that is, only a sub-set L of topics 14 of the k topics are annotated in the operation 16. More typically k>>L, that is, usually only a small number of the topics are annotated The inputs 10, 14, 18 are supplied to an electronic data processing device, such as an illustrative computer 20, which is programmed to implement a modeling engine 22 that performs method operations S2, S3, S4 (and optionally also operation S5) of FIG. 1 in order to create a document-topic model 24 (also called an NMF model herein) for k topics including the L labeled topics. The computer 20 preferably performs operations S2, S3, S4 automatically, that is, without user input other than inputs 10, 14, 18. In some embodiments the inputs 10, 14, 18 are provided to the computer 20 via a user interfacing device (e.g. keyboard 30 and LCD or other display device 32, and/or a mouse, trackball, et cetera); in other embodiments, only one or two of the inputs 10, 14, 18 are provided by the user interfacing device(s) 30, 32—for example, the user may supply the number of topics k and the word lists defining the L annotated topics via the user interfacing device(s) 30, 32, while the set of documents 10 is generated automatically by the computer 20 or by another electronic data processing device such as a web crawling server that also executes a process to create a BOW vector for each document obtained by the web crawling. If the modeling engine 22 also performs the semantic topic identification operation S5 including manual semantic identification, then it suitably interacts with the user via the user interfacing device(s) 30, 32 in order to (1) present to the user a top-N list of words (or other list of most strongly associated words) obtained from the word vector generated for the topic in the NMF operation S4 and (2) receive from the user a semantic description of the topic.

The electronic data processing device 20 is further programmed to perform at least one data mining operation 36 using the document-topic (i.e. NMF) model 24. As some illustrative examples, the operation 36 may, in various embodiments: present a "top M" list of documents to the user on the display device 32, which include the M documents scoring most highly for a topic of interest in the document vector generated for the topic in the NMF operation S4; receive from the user a selection of one document (an "input" document) of the set of documents 10 via the user interface 30, 32 and output via the display device 32 a list of other documents ("output" documents) of the set of documents 10 having the most similar topic scores stored in the document vectors generated for the k topics in the NMF operation S4; annotate each document of the set of documents 10 with semantic descriptions of the top M topics, that is, the M topics of the k topics for which the document scored most highly in the document vectors generated for the topics in the NMF operation S4; and so forth.

It will be appreciated that much of the processing time of the data mining performed by the data mining system of FIG. 2 is taken up in the creation of the document-topic model (modeling engine 22). Similarly, most user interaction with the data mining system of FIG. 2 is performed during the creation of the document-topic model (modeling engine 22). By contrast, the operation 36 in which the user employs the created NMF model 24 to perform data mining tasks is both computationally light (e.g., comparing or ranking scores contained in the document and/or word vectors) and entails limited user interaction (e.g. selecting a document to identify similar documents, selecting a topic to explore, et cetera). Accordingly, significant technical advantages are gained by employing the modeling engine 22 employing the process operations S2, S3, S4 (and possibly S5) disclosed herein with reference to FIG. 1. These advantages include, but are not limited to, the data mining system exhibiting: more efficient user interfacing as the user is able to delineate the topics more efficiently by inputting nonexhaustive word lists for only a sub-set of L topics; more efficient processing as the NMF constrained by the NMF factors generated by operations S2, S3 is more likely to converge to a semantically meaningful result and thus avoid the need to run multiple repetitions of the model creation (indeed a semantically meaningful result is nearly guaranteed for the L topics which are likely to be of most interest) as compared with conventional clustering approaches (including those employing conventional NMF without the constraints disclosed herein); and more accurate data mining performance due to the document-topic model having enhanced accuracy for the L annotated topics and improved overall accuracy for the remaining (k−n) topics to due constraints on the NMF iterations imposed by the initialized (and optionally frozen) document and word vectors for the L annotated topics supplied by operations S2, S3.

With reference back to FIG. 1, the document classification operation S2 can use any of a variety of classifiers. However, a classifier such as a linear least square classifier, Naïve Bayes classifier, or Logistic regression classifier is advantageous for use in operation S2 because these are linear classifiers, and therefore correspond exactly to the latent representation of NMF, which is based on a bilinear model. Furthermore, the approach of FIG. 1 could be extended to iterate operations S2-S4 with one step of self-training where the predictions on the unlabeled data could be used to train the classifier again.

In some actually performed experiments using the approach of FIG. 1, document-topic models were created for k=6, 8, or 15 topics, with the number of annotated topics L=2, 3, or 4, and the word lists annotating the annotated topics including between 5 and 20 words. The approach of FIG. 1 using a Naïve Bayes classifier for the operation S2 was performed (i) with the NMF operation S4 being merely initialized to the document and word vectors output for the L annotated topics in operation S3 ("NMF Initialization"); and (ii) with the NMF operation S4 being both initialized to the document and word vectors output for the L annotated topics in operation S3 and thereafter frozen, i.e. not updated by the NMF after the initialization. In these operations, rescaling operators were used to set the document and word vectors on the same scale. The thusly created document-word models were found to perform comparably with or better than various baseline approaches.

In the foregoing, it has been assumed that the D documents of the set of documents 10 are entirely unlabeled with respect to the topics. However, if some of these documents are labeled by topic (typically labeled with one, or possibly more, of the L annotated topics, since these topics are a priori known), then this information may be used to improve the created document-topic model. In this case, the document labels correspond to the same topics as the feature (word) labels. In this case, the feature labels are suitably appended to the document labels, that is, a document is labeled with topic c if it has at least one feature (word) of topic c or the document is annotated with topic c.

In another contemplated extension, the document labels are not associated to any of the L topics (this might occur, for example, if the document label is not readily associated with any particular word, for example in the case of a document label such as "fun document" or "complex document"). In this case, two or more words labeled with topics are used in order to capture contexts for the document labels.

The operations S2, S3, S4 (and optionally S5) are suitably performed by the computer 20 or other electronic data processing device. It will be further appreciated that the various data processing operations S2, S3, S4 (and optionally S5) may be embodied as a non-transitory storage medium storing instructions executable by the computer 20 and/or some other electronic data processing device to perform the disclosed operations. The non-transitory storage medium may, for example, be a hard disk or other magnetic storage medium, or a FLASH memory or other electronic storage medium, or an optical disk or other optical storage medium, various combinations thereof, or so forth.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system operating on a set of documents comprising text, the system comprising:
   a computer;
   a user interfacing device including a display and at least one user input device; and
   a non-transitory storage medium storing instructions programming the computer to perform operations including:
   (i) receiving, via the user interfacing device, L labeled topics each labeled with a word list comprising words representative of the labeled topic;
   (ii) performing probabilistic classification of the documents of the set of documents to generate for each labeled topic of the L labeled topics a document vector whose elements store scores of the documents for the labeled topic and a word vector whose elements store scores of words of a vocabulary for the labeled topic;
   (iii) performing non-negative matrix factorization (NMF) to generate a NMF model that clusters the set of documents into k topics where k>L and the performing NMF includes initializing NMF factors representing L topics of the k topics to the document and word vectors for the L labeled topics generated in the operation (ii); and
   performing data mining using the NMF model.

2. The system of claim 1 wherein the operation (ii) comprises:
   (ii)(a) performing probabilistic classification of the documents of the set of documents based on text content of the documents and the word lists of the L labeled topics and generating a document vector for each labeled topic whose elements store scores of the documents for the labeled topic produced by the probabilistic classification; and
   (ii)(b) based on the document vectors for the L labeled topics and the text content of the documents of the set of documents, generating a word vector for each labeled topic whose elements store scores of words of a vocabulary for the labeled topic.

3. The system of claim 2 wherein the NMF factors representing the L topics initialized to the document vectors generated in operation (ii)(a) and the word vectors generated in operation (ii)(b) are not updated by the NMF after the initialization.

4. The system of claim 2 wherein, in the operation (ii)(a), the probabilistic classification of the documents of the set of documents is performed further based on topic labels of a sub-set of the set of documents which are labeled with topic labels.

5. The system of claim 1 wherein the NMF factors representing the L topics initialized to the document and word vectors generated in operation (ii) are not updated by the NMF after the initialization.

6. The system of claim 1 wherein the probabilistic classification of operation (ii) is performed using a Naïve Bayes or logistic regression classifier.

7. The system of claim 1 wherein the data mining performed using the NMF model includes:
   (iv) assigning at least one label to a document of interest of the set of documents based on the generated NMF model; and
   (v) displaying the at least one label assigned to the document of interest on the display.

8. The system of claim 1 wherein the data mining performed using the NMF includes displaying a list of documents of the set of documents indicated by the generated NMF model as belonging to a topic of interest of the k topics.

9. A method comprising:
   receiving, at a computer, D documents each represented by a bag-of-words (BOW) vector of length W over a vocabulary;
   receiving, at the computer and from a human annotator, L labeled topics wherein each labeled topic is labeled with a word list comprising words of the vocabulary that are representative of the labeled topic;
   performing, using the computer, probabilistic classification of the D documents to generate for each labeled topic a document vector of length D and a word vector of length W;
   performing, using the computer, non-negative matrix factorization (NMF) to generate a NMF model that clusters the D documents into k topics where k>L and the performing NMF includes initializing NMF factors representing L topics of the k topics to the document and word vectors for the L labeled topics generated by the probabilistic classification of the D documents; and
   performing data mining using the NMF model including at least one of:
      displaying a list of documents of the D documents indicated by the NMF model as belonging to a topic of interest of the k topics, and
      receiving from a human user a selection of a document of the set of documents and displaying a list of other documents of the set of documents having most similar topic scores indicated by the NMF model.

10. The method of claim 9 wherein performing probabilistic classification comprises:
    performing probabilistic classification of each document with respect to each labeled topic by computing an overlap score quantifying overlap of the BOW vector representing the document with the word list of the labeled topic,
    generating a document vector of length D for each labeled topic whose elements store the overlap scores of the D documents with the word list of the labeled topic, and
    generating a word vector of length W for each labeled topic based on the document vector for the labeled topic and the BOW vectors representing the D documents.

11. The method of claim 10 wherein the NMF factors representing the L topics initialized to the document vectors of length D and word vectors of length W generated by the probabilistic classification are not updated by the NMF after the initialization.

12. The method of claim 10 wherein the probabilistic classification is performed using a Naïve Bayes or logistic regression classifier.

13. The method of claim 10 wherein the data mining performed using the NMF model includes:
    displaying, on a display device, a label assigned to a document of the D documents based on the NMF model.

14. The method of claim 10 wherein the data mining performed using the NMF model includes:
  displaying, on a display device, a list of documents of the D documents indicated by the NMF model as belonging to a topic of interest of the k topics.

15. The method of claim 9 further comprising:
  generating a semantic identification for at least one topic of the k topics, which is not one of the L labeled topics, based on highest-ranked words a word vector generated for the topic by the performed NMF.

16. The method of claim 9 wherein the NMF factors representing the L topics initialized to the document vectors of length D and word vectors of length W generated by the probabilistic classification are not updated by the NMF after the initialization.

17. A non-transitory storage medium storing instructions executable by a computer to operate on documents of a set of D documents each represented by a bag-of-words (BOW) vector of length W over a vocabulary by operations including:
  (i) receiving L labeled topics each labeled with a word list comprising words of the vocabulary that are representative of the labeled topic;
  (ii) performing probabilistic classification of the D documents to generate for each labeled topic of the L labeled topics a document vector of length D whose elements store scores of the D documents for the labeled topic and a word vector of length W whose W elements store scores of the W words of the vocabulary for the labeled topic;
  (iii) generating a document-topic model by clustering the D documents into k clusters where k>L and the clustering includes initializing L clusters of the k clusters to the L labeled topics generated in the operation (ii); and performing data mining using the document-topic model.

18. The non-transitory storage medium of claim 17 wherein the operation (ii) comprises:
  (ii)(a) performing probabilistic classification of the D documents based on the BOW vectors representing the D documents and the word lists of the L labeled topics and generating a document vector of length D for each labeled topic whose D elements store scores of the D documents for the labeled topic produced by the probabilistic classification; and
  (ii)(b) generating the word vectors of length W for the L labeled topics based on the document vectors for the L labeled topics and the BOW vectors representing the D documents.

19. The non-transitory storage medium of claim 17 wherein the clustering operation (iii) comprises performing non-negative matrix factorization (NMF).

20. The non-transitory storage medium of claim 17 wherein the L clusters initialized to the L labeled topics generated in operation (ii) are not updated by the clustering after the initialization.

* * * * *